United States Patent [19]

Geisthoff

[11] 4,236,420
[45] Dec. 2, 1980

[54] WIDE-ANGLE JOINT

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 91,954

[22] Filed: Nov. 7, 1979

Related U.S. Application Data

[63] Continuation-in-part of Ser. No. 837,012, Sep. 27, 1977, abandoned.

[30] Foreign Application Priority Data

Oct. 2, 1976 [DE] Fed. Rep. of Germany ....... 2644671

[51] Int. Cl.³ .................... F16H 35/00; F16D 3/18
[52] U.S. Cl. ...................... 74/380; 64/9 R; 64/19
[58] Field of Search ............ 64/17, 19, 23.7, 9 R; 74/380, 384, 640

[56] References Cited

U.S. PATENT DOCUMENTS

| Re. 7,452 | 1/1877 | Black | 74/380 |
| 82,084 | 9/1868 | Case | 64/19 |
| 2,316,243 | 4/1943 | Hubbard | 64/9 R |
| 3,261,223 | 7/1966 | Vertut | 74/380 |

FOREIGN PATENT DOCUMENTS

| 948568 | 8/1956 | Fed. Rep. of Germany | 64/19 |
| 2105751 | 4/1970 | Fed. Rep. of Germany | 64/17 |
| 2144467 | 3/1972 | Fed. Rep. of Germany | 64/17 |

OTHER PUBLICATIONS

Duditza, "Cardan Joint Transmission and Their Applications", 1973, VDI-Verlag, pp. 66–69.

*Primary Examiner*—Samuel Scott
*Assistant Examiner*—G. Anderson
*Attorney, Agent, or Firm*—Toren, McGeady and Stanger

[57] ABSTRACT

A wide-angle joint for use in torque transmission couplings between a driving vehicle, such as a tractor, and a driven implement, such as an agricultural machine, includes a pair of universal joints, one connected to the driving vehicle and the other to the driven implement, interconnected by a double inner yoke. The yoke has outer limbs associated with each of the universal joints. Two gear segment pairs, disposed in meshed engagement are supported on the outer limbs of the yoke, each associated with a different universal joint. The gear segment pairs execute a joint rolling movement in a tilting plane disposed at an angle of more than 0° and less than 90° relative to surface over which the driving vehicle travels. An elongated spring is connected at one of its ends to the wide-angle joint and at its other end to an attachment between the vehicle and the implements. The spring maintains the tilting plane of the gear segment pairs at the desired angle.

2 Claims, 5 Drawing Figures

WIDE-ANGLE JOINT

This is a continuation-in-part of patent application Ser. No. 837,012, filed Sept. 27, 1977, now abandoned.

BACKGROUND OF THE INVENTION

The present invention relates generally to torque transmitting couplings between a driving tractor and a trailing or driven farm or agricultural implement, and, more particularly, to a wide-angle joint used in such a torque transmitting coupling to allow for tilting or swiveling movement of the various connecting parts of the coupling as a result of riding over irregular terrain or turning the tractor and trailing implement about a curve or corner.

Wide-angle joints have been known for the transmission of driving torque from a farm tractor to a trailing or otherwise attached agricultural implement.

Some of the prior proposals for such wide-angle joints have been structured with external guide means, such as chain drives or meshing gear segment pairs as shown in FIGS. 4 and 5 (see Duditza, "Cardan Joint Transmissions and Their Applications", VDI-Verlag). While this type of external guide means permits wide-angle tilting or swiveling through an angle of more than 90°, the mechanism is capable of tilting or swiveling in only a single plane. Accordingly, distortion or bending forces on the joint occurring in other planes may result in fracture of one or more of the structural elements forming the joint.

Previously, it has been proposed that the tilting or swiveling plane in wide-angle joints of this type, be fixed in a horizontal plane, note FIGS. 4 and 5 showing such an arrangement. Fixing the tilting plane in the horizontal plane will allow the tractor with the trailing implement to be driven about curves and corners, since the coupling between the tractor and the trailing implement will tilt, swivel or otherwise pivot about a vertical axis. The fixing of the tilting plane in the horizontal plane, however, will not permit the coupling to compensate for movement about the longitudinal or transverse axes of the transmission which may occur in the coupling as a result of travel over irregular terrain.

Another type of wide-angle joint is disclosed in German PS No. 948,568. In this wide-angle joint, a pair of spherical housing members are concentrically engaged with each other to provide pivotal movement about a fixed common centerpoint. This type of arrangement has a maximum swivel angle of only 80°, and has the further disadvantage that the cooperating surfaces of the spherical members must be specially treated which tends to be relatively expensive. Additionally, this type of wide-angle joint requires external concentric alignment means having relatively large dimensions. Further, when tilting or swiveling movements occur, variations in the length of the wide-angle joint result, since the center of the swiveling action necessarily coincides with the common centerpoint of the spherical members. As a result, special provisions must be made to compensate for such length variations.

Accordingly, it is the primary object of the present invention to provide a wide-angle joint for use in torque transmission couplings having external guide means permitting tilting movement of the joint about a vertical axis of the coupling as a result of driving the tractor with the trailing implement about curves or corners, and also permitting movement about the longitudinal and transverse horizontal axes of the coupling as a result of driving the tractor and trailing implement over irregular terrain, and without causing torsional forces within the joint.

SUMMARY OF THE INVENTION

The foregoing object is accomplished by providing a wide-angle joint for torque transmission couplings between a driving vehicle, such as a tractor, and a driven implement such as an agricultural machine which includes a first universal joint coupled with the driving vehicle, a second universal joint coupled with the driven implement, with the universal joints being interconnected by a double inner yoke. The inner yoke has outer limbs or fork arms associated with each universal joint. External guide means are provided by two gear segment pairs. Each gear segment pair is formed on the outer limbs of the yoke associated with a different universal joint with the gear segment pairs being in meshed engagement on the outer limbs of the yoke. The supports for the outer limbs are journaled in bearings associated with each of the universal joints. The distinguishing feature of the present invention over the prior art is the use of a spring non-rotatably connected to the wide-angle joint relative to the gear segment pairs and acting on the gear segment pairs for maintaining the tilting plane of the wide-angle joint at an angle of greater than 0° and less than 90° with respect to the ground or other generally horizontal supporting surface for the driving vehicle and driven implement.

Maintaining the tilting plane of the wide-angle joint in the torque transmission coupling at an angle of more than 0° and less than 90° relative to the surface over which the combined vehicle and implement are driven, by the use of a spring acting on the two gear segment pairs forming the external guide means, allows substantial freedom of rotation of the external guide means about the longitudinal axis of the wide-angle joint. Accordingly, such an arrangement permits compensation of the angular variations resulting from driving the tractor with its trailing implement about curves and also resulting from twisting movement produced in the coupling when driving over irregular or non-level surfaces. Therefore, the wide-angle joint of the present invention has the particular advantage of being able to compensate the total angular deviations in the vertical, and horizontal longitudinal and transverse axes up to a total angle in excess of 90°.

A further feature of the present invention is to maintain the tilting plane of the wide-angle joint at an angle of approximately 45° with respect to the ground or other generally horizontal supporting surface for the driving vehicle.

Because wide-angle joints of the type described herein are capable of tilting or swiveling movement in only a single plane, it is obvious that there is a dead center point through which a line extending perpendicular to this plane will pass and about which no tilting or swivel movement is possible. This forms a point about which the wide-angle joint cannot yield if stress is applied to the joint in the direction of a line perpendicular to the tilting plane. Accordingly, the 45° incline of the tilting plane for the wide-angle joint with respect to the ground or other supporting surface is an extremely suitable and desirable angle of inclination, since the line passing through the dead centerpoint will also be oriented at an angle of 45° with respect to the ground or other supporting surface. It is extremely unlikely in practice that the sum of the angle deviations about each of the three axes would actually coincide with this predetermined dead center to cause any problems.

Preferably, spring means used to maintain the tilting plane at the desired angle of inclination is a tension spring which may be connected at one of its ends to a coupling or traction bar of either the driving tractor or the trailing farm implement. Alternatively, a torsion spring could be connected to a non-rotatable tubular sleeve acting as a guard about the torque coupling between the tractor and the trailing implement. The spring means is attached to the coupling so that it is non-rotatable relative to the gear segment pairs.

DESCRIPTION OF THE INVENTION

Figure 1:
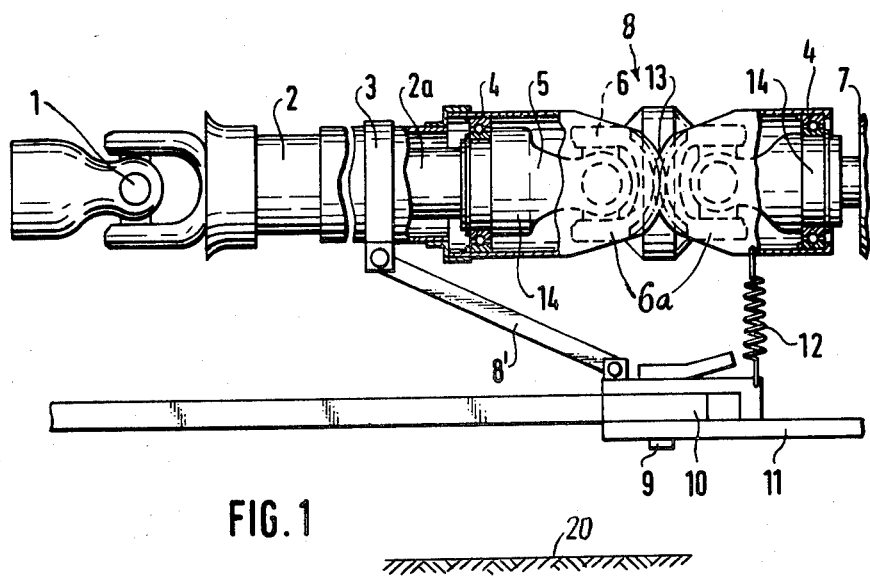
FIG. 1 is a diagrammatic illustration of a cardan shaft type transmission coupling including a wide-angle joint according to the present invention.

In the drawing, the torque transmitting coupling between the driving vehicle, such as a tractor, and the driven implement, such as an agricultural machine, includes a simple universal or cardan joint 1 connected with the driving vehicle, not shown, and coupled to one end of a shaft 2a. An axially extending portion of shaft 2a is surrounded by a non-rotatable tubular guard 2. A wide-angle joint 8, according to the present invention, is positioned between the other end of shaft 2a and a drive box or housing 7 connected with the driven implement, not shown.

Figure 4:
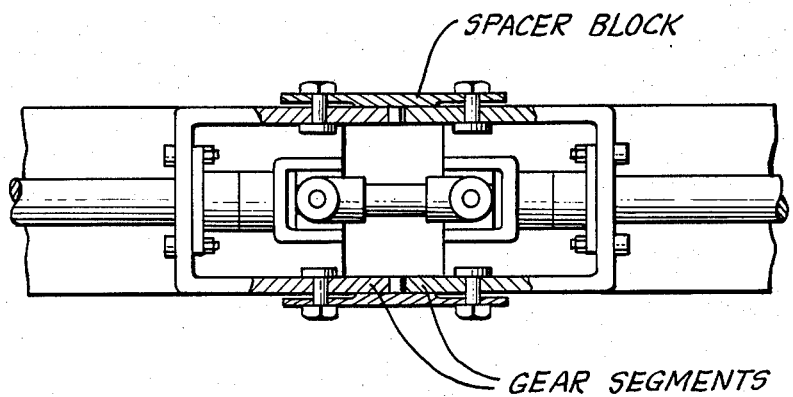
FIGS. 4 and 5 are a plan view and side view, partly in section, respectively, of the above-mentioned prior art meshed gear segment pairs.
Figure 5:
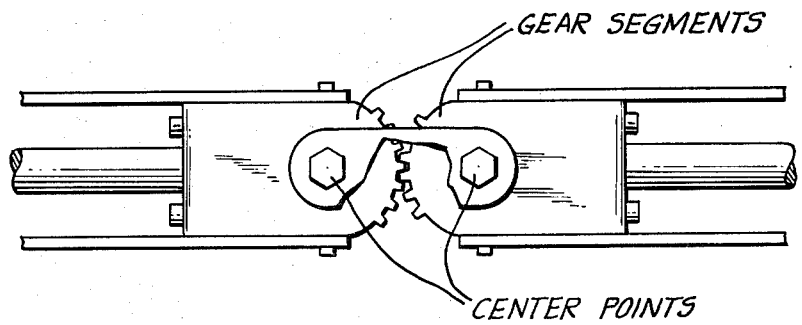

The wide-angle joint 8 is made up in a known manner, such as shown in FIGS. 4 and 5, of a pair of simple universal joints 5 connected together by means of a common double inner yoke 6. Each inner yoke is connected by a yoke shaft 14 to the corresponding universal joint 5, one of which is connected to the cardan joint 1 and the other to the housing 7. The outer ends of the yoke limbs or fork arms 6a of each of the joints 5 carries a gear segment pair 13 mounted in the bearings 4 for rotation in two parallel planes.

Figure 3:
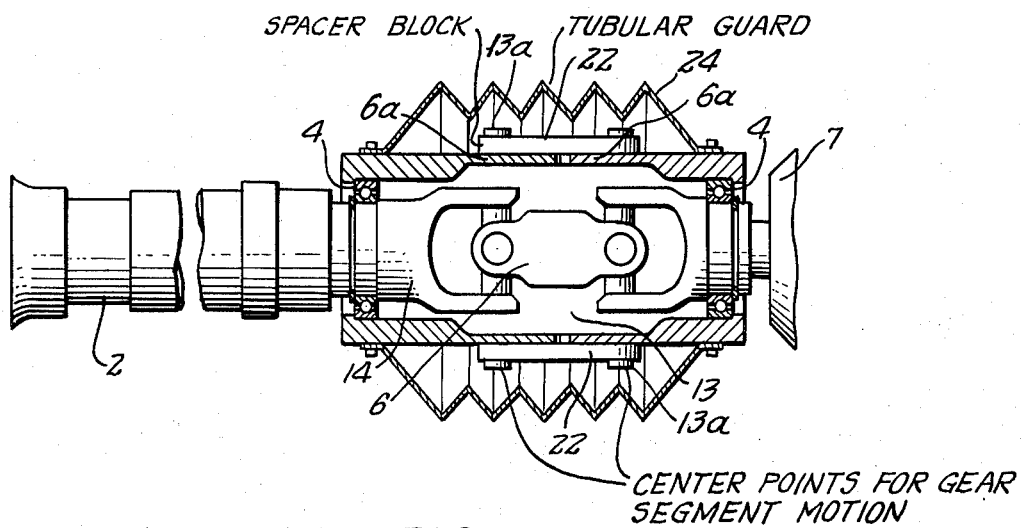
FIG. 3 is a sectional view of the coupling illustrated in FIG. 1.

In FIG. 3 the gear segment pairs 13 are viewed in a plane rotated through 90° relative to the view of FIG. 1. Spacer blocks 22 extend between and interconnect the centers 13a of gear segments associated with different joints 5. A tubular guard 24 laterally encloses the gear segment pairs 13a.

Figure 2:
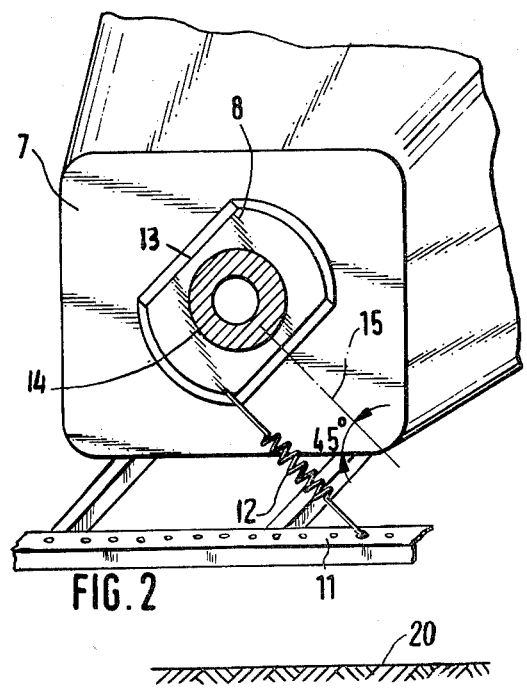
FIG. 2 illustrates the means for maintaining the tilting plane of the wide-angle joint at an angle of approximately 45° with respect to a horizontal or generally horizontal plane.

The meshed gear segment pairs 13 are arranged in such a way that the centers 13a of the graduating circles formed by each gear segment pair lie on a line passing through the rotational axis of the associated universal joint 5. The spacer blocks 22 maintain the centers 13a in meshed and uniformly spaced relation. There is only a single possible swiveling or tilting plane 15, note FIG. 2, for the wide-angle joint 8. A spring 12 maintains the plane 15 at an angle greater than 0° and less than 90°, preferably about 45°, with respect to the ground or other generally horizontal supporting surface 20 for the driving vehicle. The spring 12 is secured to attachment members extending between the tractor and the trailing agricultural implement and is connected to the wide-angle joint in the manner illustrated to maintain the tilting plane 15 at the desired angle. In FIG. 3 the arrows indicate possible locations of attachment of the spring 12 to the wide-angle joint. To assure proper maintenance of the tilting plane, the spring 12 is non-rotatably connected to the gear segment pairs 13.

Preferably, the cardan joint 1 coupled with shaft 2a is supported by a telescopic leg or strut 8'. One end of the strut 8' is pivotally connected to a clamp or strap 3 mounted on the non-rotatable tubular guard 2 laterally enclosing the shaft 2a. The other end of the strut 8' is pivotally connected to part of a coupling bar 11. In this manner, the connecting point 9 between a traction bar 10 and coupling bar 11, located beneath the transmission coupling, is freely accessible to allow for secure coupling of the trailing farm implement to the tractor. Traction bar 10 may be arranged for cooperation with lower guides on the tractor. When traction bar 10 is used to accomplish coupling between the tractor and the implement, it is desirable to support the cardan joint by a substantially U-shaped frame. By using this type of coupling between the tractor and the agricultural implement, the cardan shaft 1 is able to pivot together with the traction bar 10 and to be aligned with corresponding connecting elements on the tractor.

When the wide-angle joint 8 is subjected to forces causing tilting or swiveling movement, the gear segment pair on each joint 5 rotates relative to the other pair in a manner similar to relative rolling movement of a pair of circles about the centers 13a. During such rotational movement, the spacing between the centers 13a of the two gear segment pairs 13 will remain constant in all tilted positions due to the spacer blocks 22 and will be equal to the effective length of the double yoke 6. It is thereby insured that there will be no variation in the effective length of the wide-angle joint 8 during any tilting or swiveling movement.

In the event of any angular movement in the connecting or coupling parts between the tractor and the trailing implement about any one or all three of the main axes, specifically the longitudinal or horizontal axis, the vertical axis, and the transverse axis, the tilting or swivel plane 15 of the wide-angle joint 8 can move in a direction opposite to the force of the spring 12 holding it in its neutral position (i.e. 45° position) to occupy an appropriate new position corresponding to the sum of the angular movements about the three axes.

While the invention has been described and illustrated with respect to a preferred embodiment which produces satisfactory results, it will be appreciated by those skilled in the art, after understanding the purposes of the invention, that various changes and modifications may be made without departing from the spirit and scope of the invention, and it is, therefore, intended to cover all such changes and modifications in the appended claims.

What is claimed is:

1. A wide-angle joint for torque transmission couplings between a driving vehicle, such as a tractor, and a driven implement, such as an agricultural machine, comprising a first universal joint arranged to be connected to the driving vehicle, a second universal joint arranged to be connected to the driven implement, a double inner yoke interconnecting said first and second universal joints, said double yoke having first outer limbs associated with said first universal joint and second outer limbs associated with second universal joint, and a bearing for each of said first and second universal joints and for said limbs associated therewith, externally situated guide means comprising two gear segment pairs disposed in meshed engagement for executing a joint rolling movement in a single tilting or swiveling plane, a first said gear segment pair supported on said first outer limbs and a second said gear segment pair supported on said second outer limbs, and attachment means for connecting the driving vehicle to the driven implement spaced laterally outwardly from said first and second vehicle joints, wherein the improvement comprises an elongated spring secured at one end to the exterior of said double yoke and extending laterally outwardly therefrom transversely of the axes of said first and second universal joints and attached at its opposite end to said attachment means for rotatably maintaining the tilting plane of said two gear segment pairs at an angle of more than 0° and less than 90° relative to the surface on which the driving vehicle is supported and over which it travels pulling said driven implement and the point of attachment of said spring to the exterior of said double yoke being non-rotatable relative to said two gear segment pairs.

2. A wide-angle joint, as set forth in claim 1, wherein said spring maintains the tilting angle of the wide-angle joint at an angle of approximately 45° relative to the supporting surface for the driving vehicle.

* * * * *